(12) United States Patent
Fukami et al.

(10) Patent No.: US 8,387,415 B2
(45) Date of Patent: Mar. 5, 2013

(54) METHOD FOR BENDING A GLASS SHEET AND APPARATUS FOR BENDING A GLASS SHEET

(75) Inventors: Masao Fukami, Chiyoda-ku (JP); Taisei Mori, Chiyoda-ku (JP); Yutaka Kitajima, Chiyoda-ku (JP); Koji Izumi, Nishio (JP)

(73) Assignee: Asahi Glass Company, Limited, Tokyo (JP)

( * ) Notice: Subject to any disclaimer, the term of this patent is extended or adjusted under 35 U.S.C. 154(b) by 289 days.

(21) Appl. No.: 12/488,298

(22) Filed: Jun. 19, 2009

(65) Prior Publication Data

US 2009/0320523 A1 Dec. 31, 2009

Related U.S. Application Data

(63) Continuation of application No. PCT/JP2007/074343, filed on Dec. 18, 2007.

(30) Foreign Application Priority Data

Dec. 19, 2006 (JP) ................. 2006-341471

(51) Int. Cl.
*C03B 23/025* (2006.01)
*C03B 23/027* (2006.01)
*C03B 23/03* (2006.01)

(52) U.S. Cl. ............... 65/107; 65/290; 65/291

(58) Field of Classification Search ............. 65/106, 65/107, 275, 287, 290, 291
See application file for complete search history.

(56) References Cited

U.S. PATENT DOCUMENTS

| 5,302,176 A | 4/1994 | Shibuya et al. |
| 5,849,057 A * | 12/1998 | Didelot ............... 65/106 |
| 6,158,247 A | 12/2000 | Didelot |
| 7,401,476 B2 | 7/2008 | Fukami et al. |

(Continued)

FOREIGN PATENT DOCUMENTS

| JP | 2-30632 | 2/1990 |
| JP | 6-271325 | 9/1994 |

(Continued)

OTHER PUBLICATIONS

U.S. Appl. No. 12/792,868, filed Jun. 3, 2010, Fukami, et al.

(Continued)

*Primary Examiner* — Jason L Lazorcik
*Assistant Examiner* — Cynthia Szewczyk
(74) *Attorney, Agent, or Firm* — Oblon, Spivak, McClelland, Maier & Neustadt, L.L.P.

(57) ABSTRACT

The present invention relates to an apparatus for bending a glass sheet and a method for bending a glass sheet including an apparatus and a method for conveying a glass sheet, and it aims at producing with good efficiency a glass sheet of high quality, having complicated configuration.

The method for bending a glass sheet comprises a step of placing a heated glass sheet on an inner mold with a tilting mechanism arranged at an inner side of a forming ring with a tilting mechanism, the forming ring being provided with a fixed frame and a movable frame, to thereby preform the glass sheet, a step of transferring the glass sheet preformed on the inner mold with a tilting mechanism onto the forming ring with a tilting mechanism and a step of pressing the glass sheet with a predetermined forming plane of the forming ring and tilting the movable frame, wherein the step of preforming the glass sheet includes a step of preforming the glass sheet placed on the inner mold by tilting a movable frame of inner mold pivoted at an end of a fixed frame of inner mold provided in the inner mold.

6 Claims, 13 Drawing Sheets

U.S. PATENT DOCUMENTS

| | | |
|---|---|---|
| 2004/0107729 A1 * | 6/2004 | Fukami et al. ............ 65/25.4 |
| 2005/0138967 A1 | 6/2005 | Hori et al. |
| 2007/0026238 A1 * | 2/2007 | Chiappetta et al. ......... 428/426 |
| 2007/0144211 A1 | 6/2007 | Hori et al. |
| 2008/0000267 A1 | 1/2008 | Fukami et al. |

FOREIGN PATENT DOCUMENTS

| | | |
|---|---|---|
| JP | 8-183625 | 7/1996 |
| JP | 2003-335533 | 11/2003 |
| JP | 2003-335534 | 11/2003 |
| WO | WO 2004/103922 | 12/2004 |
| WO | WO 2008068527 A1 * | 6/2008 |

OTHER PUBLICATIONS

European Search Report in English issued Aug. 1, 2011 in application No. EP 07-85-0829.

* cited by examiner

S1: HEATING AND CONVEYING GLASS SHEET
S2: FALLING GLASS SHEET ON INNER MOLD
S3: CONVEYING GLASS SHEET JUST BELOW FORMING MOLD, TILTING MOVABLE FRAMES OF INNER MOLD AND TRANSFERRING GLASS SHEET FROM INNER MOLD TO FORMING RING WITH TILTING MECHANISM
S4: TILTING MOVABLE FRAMES WHILE PRESSING GLASS SHEET
S5: PRODUCTION TO ALL GLASS SHEET IS COMPLETE?

METHOD FOR BENDING A GLASS SHEET AND APPARATUS FOR BENDING A GLASS SHEET

TECHNICAL FIELD

The present invention relates to a method for bending a glass sheet and an apparatus for bending a glass sheet. In particular, it relates to a method for bending a glass sheet and an apparatus for bending a glass sheet, including a method for conveying the glass sheet and an apparatus for conveying the glass sheet.

BACKGROUND ART

Recent years, for a window glass sheet for automobiles, a curved glass sheet having various shapes and curvatures is required in complying with a change in design. As a technique to produce such a curved glass sheet, there is a press-forming method to be conducted in a heating furnace. This method is suitable as a method for producing a curved glass sheet having a complicated shape or a deep-set shape because a glass sheet can be bent under an elevated temperature.

Heretofore, for a press-forming method to bend a glass sheet in a heating furnace, there has been known a forming apparatus wherein a forming ring is used as a lower mold on which the glass sheet is placed, the glass sheet deforming due to its own weight before press-forming, whereby preforming is carried out, and then, the glass sheet is pressed and bent on a forming plane of forming mold.

In such forming apparatus, the glass sheet heated nearly to its softening point while it is conveyed on rollers, is placed on the forming ring by means of a transfer machine having a positioning mechanism. The forming ring holding thereon the glass sheet is moved to a pressing position at a downstream side, meanwhile the glass sheet deforms due to its own weight on the forming ring. This deformation serves as preforming before the pressing operation. At the pressing position, the glass sheet is pressed and bent in a predetermined curved shape between an upper forming mold and the forming ring located at a lower position.

In this glass sheet forming apparatus in which the preforming is carried out by only deforming the glass sheet due to its own weight, however, it is insufficient to conduct the deep-set bending to a peripheral portion of a glass sheet. On the other hand, it is known to use a forming ring with a tilting mechanism in carrying out a deep-set forming operation. The forming ring with a tilting mechanism has a generally frame-like shape in plan view, made of metal, which comprises a fixed frame at the center and movable frames at its both sides. At both sides of the fixed frame, the movable frames of substantially U-like shape in plan view are pivoted with hinges. At the time of pressing a glass sheet in association with the forming mold, the movable frames are tilted so that the peripheral portion of the glass sheet can be bent certainly.

However, in such kind of forming ring with a tilting mechanism, the hinges project upward and accordingly, the projecting portions are apt to contact locally the glass sheet whereby there produce a portion formed by the contact with the forming ring and a portion without contact therewith, in the edge portions. These portions make it difficult to control the temperature distribution in the glass sheet and therefore, reproducibility and formability can not be stable. Further, a strain is apt to produce in a portion of glass sheet by the contact with a hinge, whereby the quality decreases.

The applicant has proposed an invention disclosed in JP-A-2003-335533. According to the invention disclosed in JP-A-2003-335533, a ring provided with an inner mold is disposed inside a forming ring with a tilting mechanism. A heated glass sheet is first supported on the inner mold whereby a certain degree of bending is conducted to the glass sheet due to its own weight. Then, the glass sheet is supported by the inner mold and an outer mold arranged outside the inner mold whereby the glass sheet is bent into a final shape. Thus, such two-stage forming operation suppress the occurrence of a strain in the glass sheet due to the contact with a hinge and it is possible to control the temperature distribution in the glass sheet.

Further, a displacement of glass sheet is apt to take place when a glass sheet is placed on the forming ring with a tilting mechanism. According to the proposed invention, such problem can be eliminated because the glass sheet is placed once on the inner mold and then, it is transferred.

DISCLOSURE OF THE INVENTION

Problem to be Solved by the Invention

In recent years, the shape of a glass sheet for automobiles has been more complicated and a deep-set forming operation has been required. In order to achieve such deep-set forming with use of the invention disclosed in JP-A-2003-335533, it is necessary to prolong the time for the preforming, i.e., the time of deforming the glass sheet due to the own weight. Accordingly, it reduces productivity.

Further, in the conventional forming ring with a tilting mechanism, only a sharp tilting operation was conducted because the tilting was carried out at the time of pressing a glass sheet in association with the forming mold. Accordingly, when a sharp tilting operation was conducted at the time of deep-set forming, there was a problem that a wrinkle took place in the surface of the glass sheet.

In consideration of the above-mentioned problems, the present invention is to provide a method for bending a glass sheet and an apparatus for bending a glass sheet which can bend a glass sheet in a complicated shape or a deep-set shape with high quality.

Further, it is another object of the present invention to shorten the time of production and to realize high productivity.

Means for Solving the Problems

In order to solve the above-mentioned problems, the present invention is to provide a method for bending a glass sheet, comprising a step of placing a glass sheet heated previously to a temperature capable of bending on an inner mold arranged at an inner side of a forming ring with a tilting mechanism, the forming ring being provided with a fixed frame and a movable frame pivoted at at least one end of the fixed frame, to preform the glass sheet due to its own weight, a step of transferring the glass sheet having been preformed due to its own weight on the inner mold from the inner mold onto the forming ring with a tilting mechanism and a step of pressing the glass sheet with the forming mold having a predetermined forming plane and tilting the movable frame, the bending method for a glass sheet being characterized in that the step of preforming includes a step of preforming the glass sheet placed on the inner mold by tilting a movable frame of inner mold pivoted at at least one end of a fixed frame of inner mold provided in the inner mold.

According to the present invention, the preforming is conducted by tilting the glass sheet with the movable frame of inner mold so that deep-set bending is carried out to a certain degree. Accordingly, it is unnecessary to tilt the glass sheet sharply with the forming ring at the time of pressing the glass sheet to the forming mold, and therefore, the occurrence of a wrinkle in the glass sheet is suppressed even when a complicated deep-set bending operation is conducted, and highly accuracy bending is possible.

In an aspect of the present invention, it is preferred to employ a step of conveying the glass sheet from a position of placing the glass sheet on the inner mold to a lower position of the forming mold, during which the movable frame of inner mold is tilted for preforming.

According to the invention of this aspect, the time of production can be shortened by tilting the movable frame of inner mold while the glass plate is conveyed from a position of placing the glass sheet on the inner mold to a lower position of the forming mold.

Further, in order to solve the above-mentioned problem, the present invention is to provide an apparatus for bending a glass sheet comprising a forming ring with a tilting mechanism, which is provided with a fixed frame and a movable frame pivoted at at least one end of the fixed frame, an inner mold arrange at an inner side of the forming ring with a tilting mechanism and a forming mold having a predetermined forming plane so that a glass sheet is bent by pressing from a lower side the glass sheet placed on the forming ring with a tilting mechanism onto the forming plane of the forming mold and by tilting the movable frame, the bending apparatus for a glass sheet being characterized in that the forming ring with a tilting mechanism and the inner mold are disposed in a shuttle traveling from a position of transferring the glass sheet on the inner mold to a lower position of the forming mold, and the inner mold comprises a fixed frame of inner mold, a movable frame of inner mold pivoted at at least one end of the fixed frame and a tilting mechanism for tilting the movable frame of inner mold by an elevating motion of a movable rod provided on the shuttle.

According to this invention, the inner mold comprises the fixed frame of inner mold and the movable frame of inner mold so that a glass sheet placed on the inner mold can be tilted. This serves as preforming for deep-set bending.

Since the tilting mechanism for tilting the movable frame of inner mold according to an elevating motion of the movable rod of the shuttle is provided, preforming for deep-set bending is possible during the traveling of the shuttle, i.e., during the conveyance of the glass sheet from the position of placing the glass sheet to the lower position of the forming mold, whereby the time of production can be substantially the same level as or shorter than conventional techniques.

Further, according to an aspect of the present invention, it is preferred that the shape of the plane of inner mold on which a glass sheet is placed corresponds to the shape of the plane of the glass sheet to be placed.

According to this aspect of the present invention, the shape of the plane of inner mold on which a glass sheet is to be placed has a shape corresponding to the plane of the glass sheet to be formed. Namely, when a transferred glass sheet is flat, the shape of the plane of inner mold is flat, and when a glass sheet has a curved plane, the shape of the plane of inner mold has a shape corresponding to the curved plane. Therefore, a shift in position which may occur when the glass sheet is placed on the inner mold is avoidable, and the occurrence of a distortion in the glass sheet can be suppressed.

Effects of the Invention

According to the present invention, a glass sheet is tilted by the inner mold, and accordingly, it is unnecessary that the glass sheet is tilted sharply by the forming ring when the glass sheet is pressed to the forming mold, whereby the occurrence of a wrinkle in the glass sheet can be suppressed and highly accurate molding is possible even when a complicated deep-set bending is carried out.

Further, according to the present invention, since the preforming is carried out with high efficiency, the time of forming can be shortened, so that a high productivity can be realized.

EXPLANATION OF SYMBOLS

Figure 1:
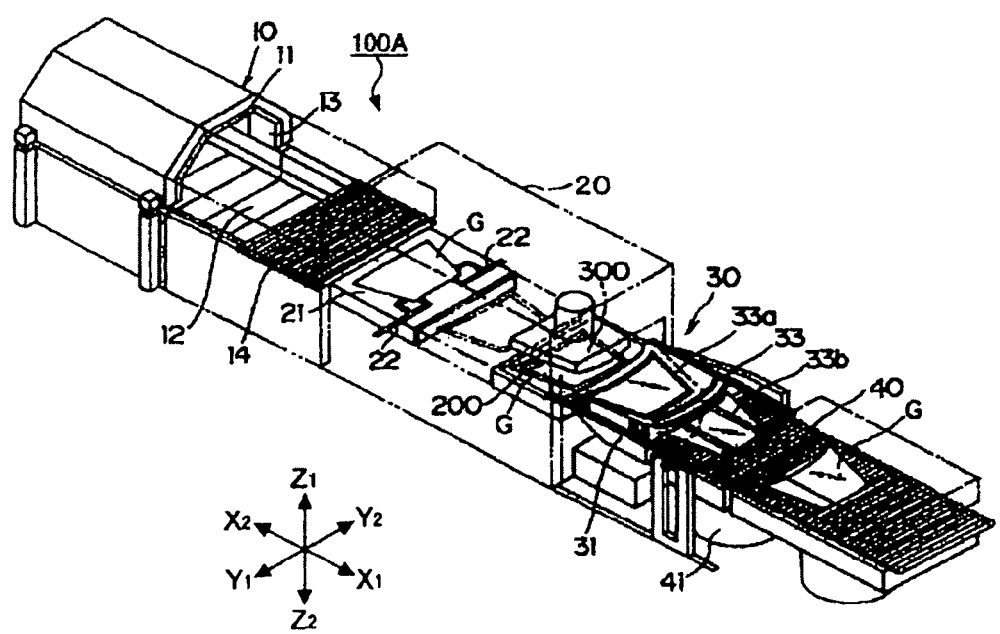
FIG. 1 is a perspective view of a first embodiment of the apparatus for bending a glass sheet according to the present invention wherein a part of the apparatus is in a see-through state.

10: Heating furnace
20: Forming furnace
30: Air-cooling/tempering apparatus
40: Delivering roller conveyor
41: Air-floating apparatus
60: Preforming apparatus
62: Full-forming apparatus
100: Glass sheet bending apparatus
200: Lower forming apparatus
500: Lower forming apparatus
220: Lower mold
230, 230A: Inner mold with a titling mechanism
235a: Curved ring
236: Pressure receiver 237, 237A: Fixed frame of inner mold
238, 238A: Hinge of inner mold
239, 239A: Movable frame of inner mold
240: Forming ring with a titling mechanism
242: Fixed frame
243: Hinge
244: Movable frame
300, 600: Upper forming apparatus
302: Forming mold
303: Pressing rod
435: Curved plate
400, 700: Shuttle
417, 718: Transfer rollers
540: Full-forming ring
602: Full-forming mold
M1-M4: Servomotor
G: Glass sheet Best Mode for Carrying Out the Invention Now, description will be made on the best mode for carrying out the present invention with reference to the drawings.

Figure 2:
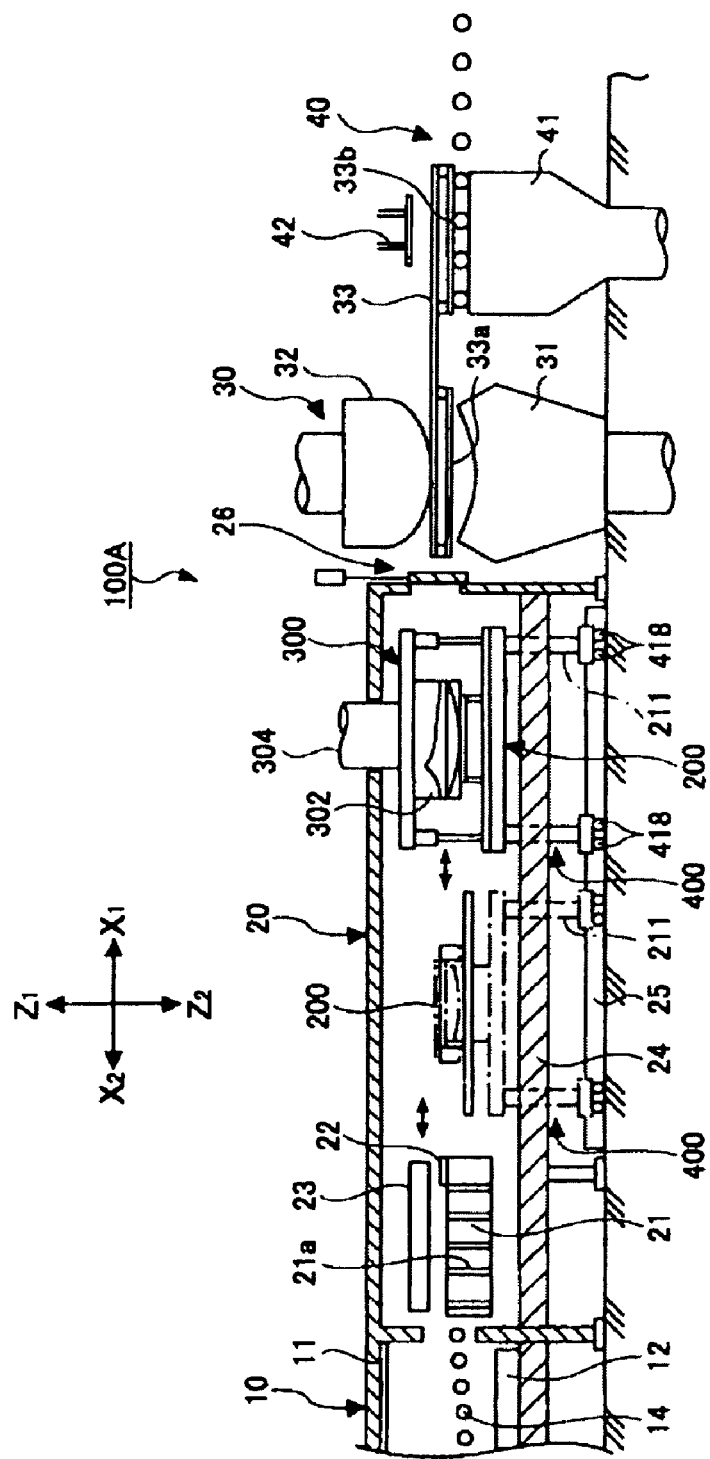
FIG. 2 is a schematic front view of the bending apparatus shown in FIG. 1.

First, description will be made as to the glass sheet bending apparatus 100A according to a first embodiment of the present invention and a method for bending a glass sheet G using such apparatus. FIGS. 1 and 2 show the glass sheet bending apparatus 100A according to the first embodiment. The glass sheet bending apparatus 100A comprises a heating furnace 10, a forming furnace 20, an air-cooling/tempering apparatus 30 and a delivering roller conveyor 40 in this order from an upper stream side of conveying a glass sheet G.

The heating furnace 10 is an electrically heating furnace having furnace walls made of refractory brick and is provided with a top heater 11, a hearth heater 12 and a side wall heater 13 on its wall surface. A roller conveyor 14 comprising a plurality of heat-resistant silica rollers is disposed above the hearth bed in the heating furnace 10, and the glass sheet G conveyed on the roller conveyor 14 is heated to a predetermined temperature (from 650 to 720° C.) for bending it by these heaters.

At the rear stage of the heating furnace 10, the forming furnace 20 which is an electrically heating furnace similar to the heating furnace 10 is disposed, and just after the carry-in entrance for the glass sheet G, a hearth bed 21 for supporting the conveyed glass sheet G in an air-floating state, is disposed. The heating furnace 10 is not limited only to the electrically heating furnace, but may be a heating furnace employing gas.

As shown in FIG. 2, the hearth bed 21 has a plurality of orifices 21a in the plane for receiving the glass sheet G. By blowing heated air through these orifices 21a, the glass sheet G is supported in a floating state. At a downstream side of the hearth bed 21, a pair of positioners 22 for positioning the glass sheet G supported in an air-floating state are disposed.

Above the hearth bed 21, a flat mold 23 (FIG. 2) capable of moving horizontally in a direction X or the opposite direction is disposed. The flat mold 23 is a platen having the same size as the glass sheet G or a size larger than the glass sheet. In the lower flat surface of the platen, a large number of air-jetting/sucking orifices are formed densely.

Above the flat mold 23, an air inlet port (not shown) communicated with these air-jetting/sucking orifices is formed, and a blower (not shown) and an air-sucking means (not shown) are connected to the air inlet port via a damper (not shown) located outside the furnace. By controlling air-sucking or air-jetting for each air-jetting/sucking orifice, it is possible to support the glass sheet G in a non-contact state.

In the ceiling of the forming furnace 20 located at the rear stage of the hearth bed 21, an upper forming apparatus 300 provided with a forming mold 302 to which a duct 304 is connected is disposed as shown in FIG. 2. Rails 25 are disposed at the under floor in the area from just below the upper forming apparatus 300 to the hearth bed 21 (FIG. 2) and mobile rollers 418 of the lower forming apparatus 200 are engaged with these rails 25, whereby the lower forming apparatus 200 can be moved along the rails 25.

The furnace floor 24 has slits (not shown) through which legs 211 of the lower forming apparatus 200 extend toward the rails 25. At the carry-out port for a glass sheet G in the forming furnace 20, a shuttle door 26 is disposed so as to slide vertically, and the shuttle door is opened or closed in response to the passing of a shuttle which is described later.

The air-cooling/tempering apparatus 30 is disposed at a rear stage of the forming furnace 20 in order to cooling and tempering a conveyed glass sheet G. The air-cooling/tempering apparatus 30 comprises a lower blowing head 31 with an air blowing port directed upward and an upper blowing head 32 with an air blowing port directed downward so as to oppose the lower blowing head 31.

The delivering roller conveyor 40 is disposed at a rear stage of the air-cooling/tempering apparatus 30, and an air-floating apparatus 41 for floating a glass sheet G on the conveyor is disposed behind the delivering roller conveyor 40 which is located just after the air-cooling/tempering apparatus 30. Above the delivering roller conveyor 40, a stopper 42 is disposed so as to oppose the air-floating apparatus 41, the stopper being to support a glass sheet G raised by the air-floating apparatus 41 and to prevent the glass sheet G from being blown off.

Between the delivering roller conveyor 40 and the air-cooling/tempering apparatus 30, a shuttle 33 for conveying a glass sheet G is disposed so as to travel horizontally. A quench ring 33a is disposed at an end of upstream side of the shuttle 33 and a catch member 33b is disposed at an end of downstream side thereof. The shuttle 33 can be moved along rails (not shown) extending from the forming furnace 20 to the delivering roller conveyor 40. By traveling reciprocally between them, a glass sheet G is conveyed from the forming furnace 20 to the delivering roller conveyor 40.

Figure 3:
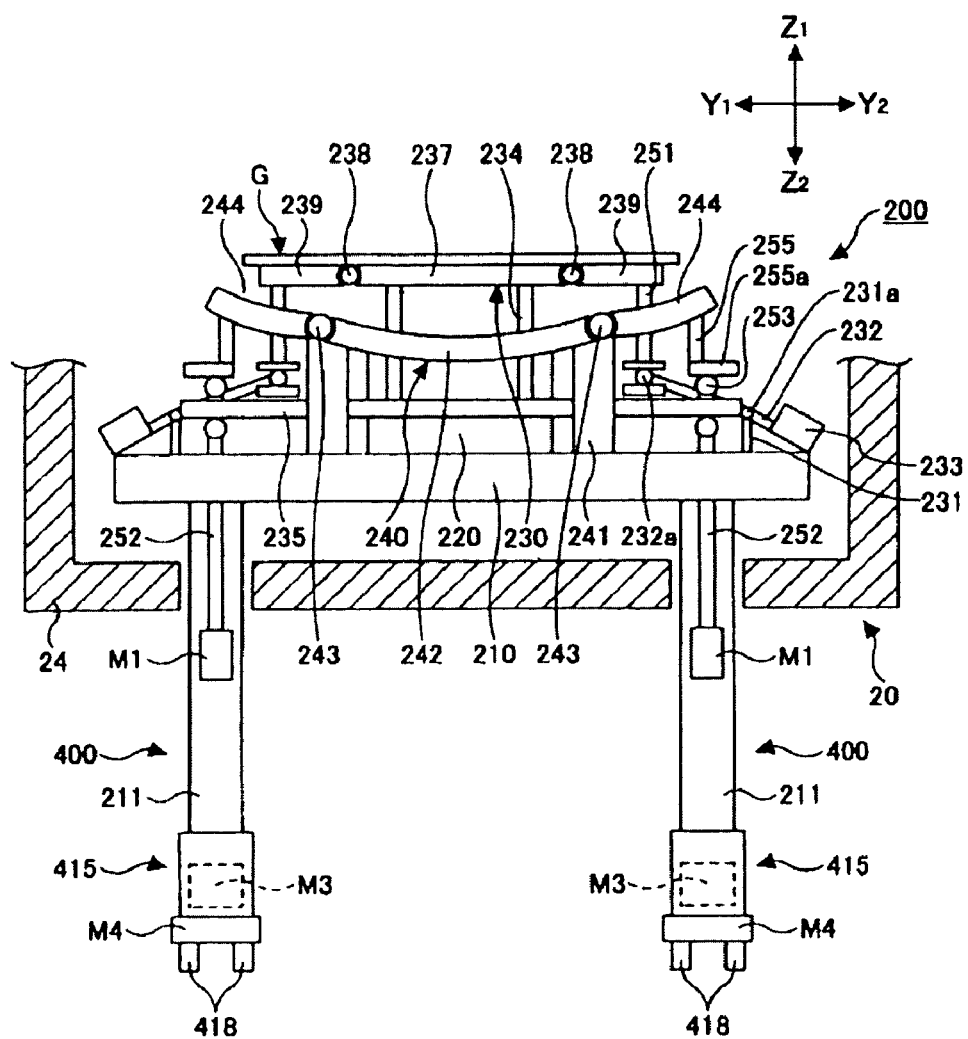
FIG. 3 is a side view showing the structure of a lower forming apparatus.
Figure 4:
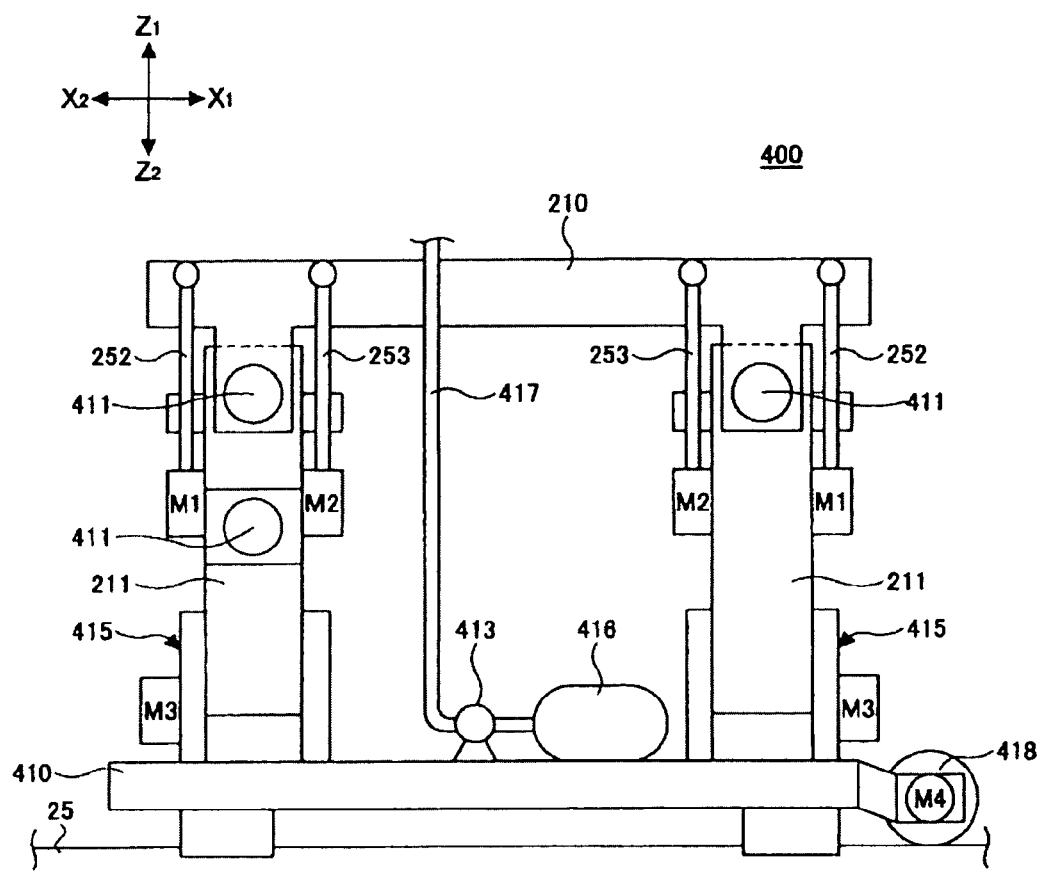
FIG. 4 is a front view showing the structure of a shuttle.

Detailed description will be made as to the lower forming apparatus 200. FIG. 3 is a side view showing the lower forming apparatus 200 in detail, and FIG. 4 is a front view of a shuttle 400 of the lower forming apparatus 200.

As shown in FIG. 3, the lower forming apparatus 200 comprises the shuttle 400 for supporting a mount 210, which is movable independently on the rails 25, a lower mold 220 disposed on the mount 210, an inner mold with a tilting mechanism 230 disposed around the lower mold 220 and movable vertically and a forming ring with a tilting mechanism 240 disposed around the inner mold with a tilting mechanism 230.

The lower mold 220 is to support a central portion of a glass sheet G heated in the forming furnace 20 to prevent the softened glass sheet G from deflecting largely.

The inner mold with a tilting mechanism 230 comprises a base 235 placed on the mount 210, support frames 234 extending vertically from the base 235, a fixed frame of inner mold 237 fixed at upper ends (ends in a direction Z1) of the support frames 234, movable frames of inner mold 239 pivoted to the fixed frame of inner mold 237 by means of hinges of inner mold 238, rods 251 for the movable frames of inner mold, each upper ends of which is connected to each movable frame of inner mold 239.

The mount 210 is provided with columns 231 and a pole 232 connected rotatably to each column 231 via a column hinge 231a. A counter weight 233 is fixed to an end of the pole 232 and a connecting member 232a is provided at the other end of the pole 232. The connecting member 232a is connected slidably to an end of a rod 25 for the movable frame of inner mold (this structure corresponds to the tilting mechanism as described in Claims).

Figure 8:
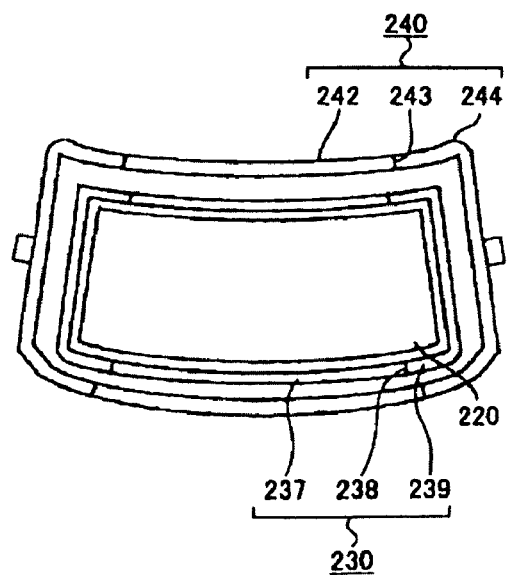
FIG. 8 is a plan view showing a lower mold, the inner mold and a ring with a tilting mechanism.
Figure 9:
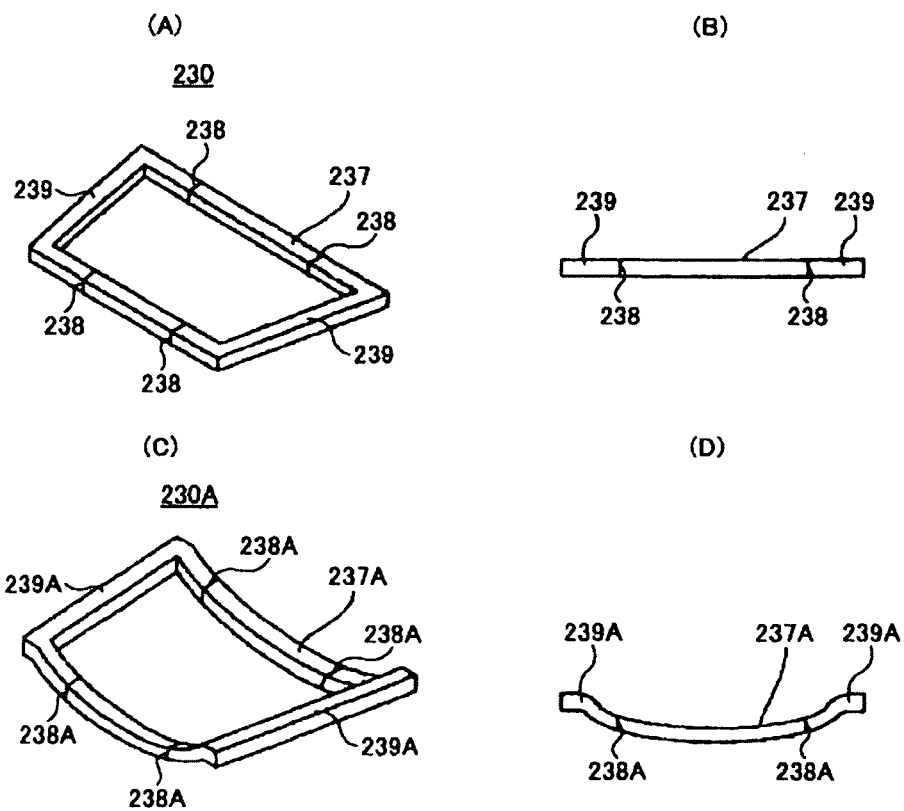
FIG. 9 shows perspective views and side views for illustrating other embodiments of the inner mold.

Each of the fixed frame of inner mold 237 and the movable frames of inner mold 239 is a ringed metallic member which shows a ring-like shape as a whole by combining some elements, as shown in FIG. 8 and FIGS. 9(A) and (B). The size of each frame is smaller than the outer contour of the glass sheet G before bending so as to support the glass sheet at a slightly inner position from its circumference.

The shuttle 400 is provided with a plurality of movable rods 252, 253 for ascending or descending in a direction of arrow mark Z1 or Z2 in the figure. Movable rods 252 can ascend or descend by servo motors M1 mounted on legs 211 of the shuttle 400, and several movable rods 252 are connected to the base 235 of the inner mold at their top end portions. Accordingly, it is possible to ascend or descend the base 235 by ascending or descending the movable rods 252 connected to the base 235.

When the movable rods 252 is ascended (in a direction of arrow mark Z1), the fixed frame of inner mold 237 and the movable frames of inner mold 239 become substantially flush (FIG. 3). Each hinge of inner mold 238 has means for restricting a movable frame of inner mold 239 from turning downward from its horizontal state. The counter weight 233 provided at an end of each pole rotates the pole 232 due to its weight so that the connecting portion 232a of the pole 232 ascend. However, since the counter weight 233 is brought to contact with the mount 210, when the movable rod 252 is ascended, the connecting portion 232a is prevented from turning beyond the position shown in FIG. 3. Thus, the turning motion is limited.

When the movable rods 252 are ascended from a falling position of the base 235 of the inner mold to raise the base 235 of the inner mold, the fixed frame of inner mold 237 is ascended, hence, the movable frames of inner mold 239 are ascended. In this case, however, since the pole 232 is restricted from turning, the pole 232 pulls the rod 251 for the movable frame of inner mold downward, whereby the fixed frame of inner mold 237 and the movable frame of inner mold 239 become flush.

Figure 6:
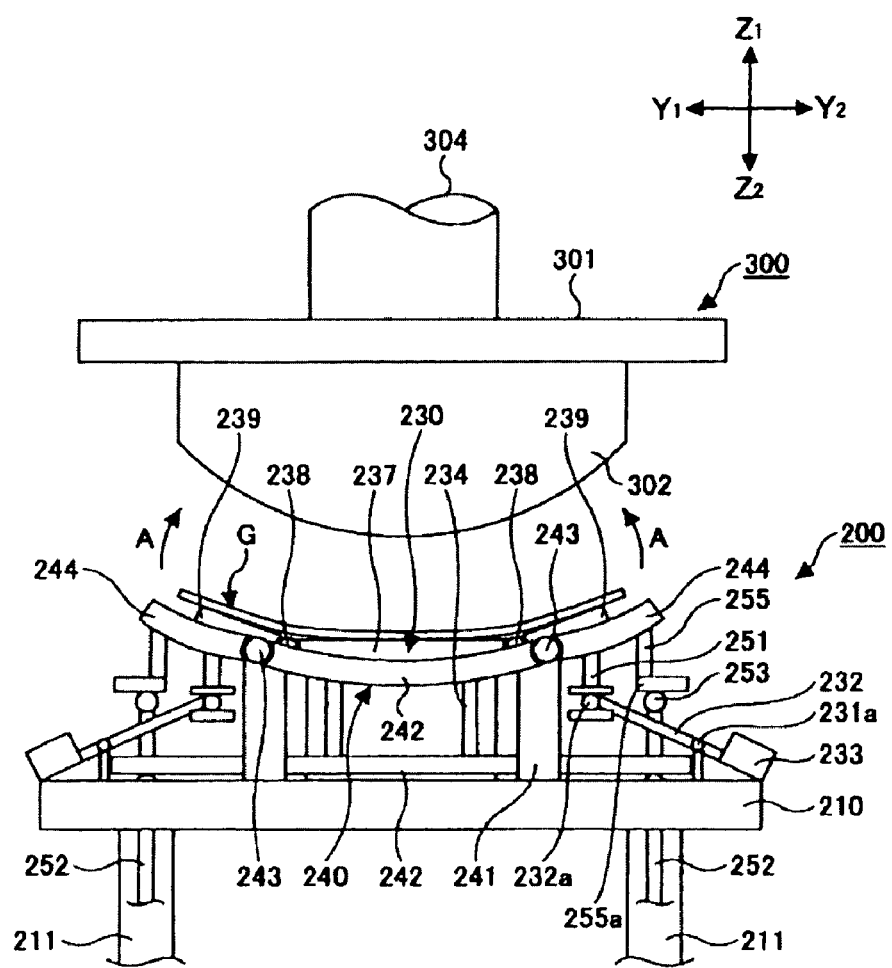
FIG. 6 is a side view showing a tilting treatment for a glass sheet by wing portions of inner mold in an inner mold.

On the other hand, when the movable rods 252 are descended (in a direction of arrow mark Z2) with the servo motors M1 to locate the base of inner mold on the mount 210, the movable frames of inner mold 239 provided respectively at left and right ends (the ends in directions of arrow marks Y1, Y2) of the fixed frame of inner mold 237 turn inward around the hinges of inner mold 238 as centers (they turn in direction as shown by arrow marks A in FIG. 6). Such inward motion of each movable frame of inner mold 239 is called "tilting".

Each hinge of inner mold 238 has means of restricting each movable frame of inner mold 239 from turning upward beyond a predetermined amount of tilting. The counter weight 233 provided at an end of each pole actuates the turning motion of the pole 232 due to its weight so that the connecting portion 232a of the pole 232 moves upward.

When the movable rods 252 are descended to descend the base 235 of the inner mold, the fixed frame of inner mold 237 descends, hence, the hinges of inner mold 238 and the movable frames of inner mold 239 descend too. When the fixed frame of inner mold 237 is descended, the rods 251 for the movable frames of inner mold receive upward pressures due to the upward movement of the connecting portions 232a of the poles 232. With these pressures, the movable frames of inner mold 239 turn inward around the hinges of inner mold 238 as centers according to an amount of descending of the fixed frame of inner mold 237, such inward turning movement causes tilting. When the movable frames turn to a predetermined amount of tilting, the hinges of inner mold 238 do not turn any more. On the contrary, the rods 251 for the movable frames of inner mold push downward (in a direction of arrow mark Z2) the connecting portions 232a of the poles 232 whereby the poles 232 are moved downward to raise the counter weights 233. Thus, the fixed frame of inner mold 237 can be descended to a predetermined position without causing the turning of the movable frames of inner mold 239 beyond a predetermined level.

In the inner mold with a tilting mechanism 230 having the construction as described above, the movable frames of inner mold 239 are tilted in a state that a glass sheet G is placed thereon so that the glass sheet G is bent inward whereby the glass sheet G is preformed. The fixed frame of inner mold 237 and the movable frames of inner mold 239 may be covered with a heat resistant cloth or a heat-resistant non-woven cloth made of stainless steel or the like so as not to damage the glass sheet G placed thereon.

When the movable rods 252 are ascended and the fixed frame of inner mold 237 and the movable frames of inner mold 239 are in a substantially horizontal state, the fixed frame of inner mold 237, the hinges of inner mold 238 and the movable frames of inner mold 239 are so adapted that they are positioned higher than the fixed frame 242 and the movable frames 244 of the forming ring with a tilting mechanism 240, which will be described later.

The forming ring with a tilting mechanism 240 comprises support frames 241 extending vertically from the mount 210, a fixed frame 242 supported by the support frames 241, movable frames 244 connected to the fixed frame 242 via hinges 243, rods 255 for the movable frames, fixed to the movable frames 244 and pressure receivers 255a provided at an end of each rod 255 for the movable frame. Each pressure receiver 255a is connected to a movable rod 253 (FIG. 4) of a servo motor M2 so that a movable frame 244 turns inward around a hinge 243 as a fulcrum.

The shuttle 400 comprises the mount 210, the legs 211, a base 410, a traveling roller 418 and so on. The mount 210 supports the inner mold with a tilting mechanism 230, a forming ring with a tilting mechanism 240 and so on. This mount 210 is connected to the legs 211 via hinges 411.

The base 410 and the legs 211 are connected via elevating units 415. The elevating units 415 are provided with servo motors M3 as driving sources so as to ascend or descend the legs 211 with respect to the base 410. On the base 410, a pump 413 and a tank 416 are disposed. The tank 416 is connected to the lower mold 220 with a pipe 417 via the pump 413. The lower mold 220 is a metallic (cast metal) mold having a hollow interior and has a plane of predetermined curved shape, which is brought into contact with a glass sheet G. In the plane to be contact with the glass sheet G, an innumerable number of orifices are formed so as to communicate directly with the hollow portion. The plane to be contact with the glass sheet G is covered with a heat resistant cloth or a heat-resistant non-woven cloth made of stainless steel or the like.

When a glass sheet has a portion difficult to bend into a desired shape, in particular, when it is necessary to bend largely a portion near the circumference of glass sheet G, the glass sheet is sucked by vacuuming air into the lower mold 220 by the pump 413 to attract the glass sheet G to the lower mold 220 and then, the glass sheet is bent. On the other hand, the glass sheet G may be separated by blowing air from the lower mold 220. The principal role of the lower mold is to prevent the softened glass sheet G from deflecting largely.

Accordingly, when it is unnecessary to support the glass sheet G, the lower mold 220 is unnecessary. Further, when it is unnecessary to bend a glass sheet G by utilizing vacuuming or the like, the pump 413 and the tank 416 are unnecessary.

The base 410 is provided with the traveling roller 418 which is driven by a servo motor M4. As described before, since the traveling roller 418 is engaged with the rails 25, the actuation of the servo motor M4 causes the movement of the shuttle 400 in a direction of arrow mark X2 or X2 (in a direction of conveying a glass sheet G) as shown in the figure. The servo motor M4 disposed on the shuttle 400 is connected to a controller (not shown) for an integrated control of the glass sheet bending apparatus 100A and the driving is controlled by this controller.

Figure 5:
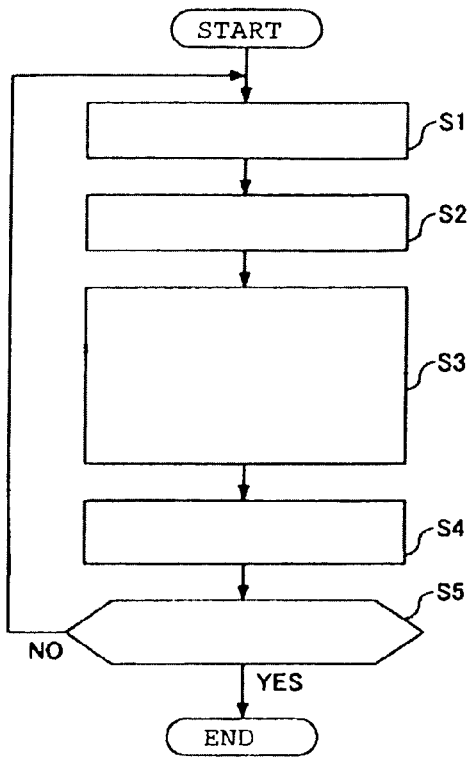
FIG. 5 is a flowchart of an embodiment of the bending method according to the present invention.

Now, description will be made as to a method for bending a glass sheet G using the glass sheet bending apparatus 100A with reference to FIG. 5. FIG. 5 is a flowchart showing the method for bending a glass sheet G according to an embodiment.

First, the glass sheet G heated gradually in the heating furnace 10 in FIG. 2 is conveyed by the roller conveyor 14 to the forming furnace 20 (Step S1). The glass sheet G conveyed into the forming furnace 20 is placed on the hearth bed 21 located just after the carry-in entrance. From an innumerable number of orifices 21a formed in the hearth bed 21, heated air is jetted out and the glass sheet G is floated by a blowing force of air so that it is supported in an air-floating state.

The hearth bed 21 has a falling gradient of about 1° in the forward direction of conveyance (the direction of an arrow mark X1 in FIG. 2) for the glass sheet G, and the glass sheet G travels in the X1 direction due to the movement of inertia given when it is conveyed by the roller conveyor 14 and its own weight. As shown in FIG. 1, a pair of positioners 22 are disposed on stand-by at the front in the conveying direction of the glass sheet G so that they contact the both front corners of the glass sheet G when it is advanced. These positioners 22 are moved properly in a detection of X or Y in FIG. 1 according to instructions from a control device (not shown), whereby the positioning of the glass sheet G on the hearth bed 21 is determined.

Above the positioned glass sheet G, the flat mold 23 for holding the glass sheet G by sucking is disposed on stand-by and the positioned glass sheet G is sucked and held by this flat mold 23. Then, the flat mold 23 is moved horizontally and is stopped at the upper portion of the lower forming apparatus 200 disposed on stand-by at the position shown by a one-dotted chain line in FIG. 2. Then, the sucking of air is canceled whereby the glass sheet G falls onto the lower forming apparatus 200 to be in a state that it is placed on the inner mold with a tilting mechanism 230 (Step S2). Specifically, the glass sheet G is placed on the fixed frame of inner mold 237 and the movable frames of inner mold 239 all of which are held horizontally. FIG. 3 shows a state that the glass sheet G is transferred from the flat mold 23 to the inner mold with a tilting mechanism 230.

Thus, when the glass sheet G is placed on the fixed frame of inner mold 237 and the movable frames of inner mold 239 all of which are held horizontally, the lower forming apparatus 200 (the shuttle 400) is moved on the rails 25. Then, the servo motors M1 are actuated to descend the movable rods 252 whereby the base 235 descends too, and the movable frames of inner mold 239 are turned in directions of arrow marks A as shown in FIG. 6. The glass sheet G placed on the inner mold with a tilting mechanism 230 is softened by heat to a temperature capable of bending it in a high temperature environment of the forming furnace 20.

Accordingly, the glass sheet G placed on the inner mold with a tilting mechanism 230 is tilted by the movable frames of inner mold 239 pivoted at both ends of the fixed frame of inner mold 237 whereby preforming is carried out. In this case, the preforming rate (the tilting rate) for the glass sheet G is subjected to the control of the servo motors M1. Namely, it can be controlled by adjusting the moving rate of the movable rods 252 in a direction Z1.

The glass sheet G, while undergone the preforming, is conveyed to a position just below the upper forming apparatus 300 by means of the lower forming apparatus 200 (the shuttle 400) traveling on the rails 25, and is stopped there. According to this method, the preforming is carried out in a time of conveying the glass sheet G. Therefore, the time of production can be shortened and the efficiency of forming the glass sheet G can be improved.

In FIG. 6, the upper forming apparatus 300 comprises a forming mold 302 disposed on a mount 301 and a duct 304 communicated with the forming mold 302. The forming mold 302 is a metallic (cast metal) mold having a hollow interior and has a plane of predetermined curved shape with which the glass sheet contacts (hereinbelow, referred to as the forming plane).

An innumerable number of orifices are formed in the forming plane. When air is vacuumed up through the duct 304, air is sucked from each orifice into the mold, so that the glass sheet G after having been press-bent can be supported by sucking. On the contrary, air can be blown through the duct 304. The forming plane of the forming mold 302 is covered with a heat resistant cloth or a heat-resistant non-woven cloth made of stainless steel or the like.

The downward movement of the base 235 causes a downward movement of the fixed frame of inner mold 237. Accordingly, the forming ring with a tilting mechanism 240 and the inner mold with a tilting mechanism 230 come closer each other while the glass sheet G is tilted, as shown in FIG. 6. While the base 235 continues to descend to reach the mount 210, the glass sheet G is transferred gradually from the inner mold with a tilting mechanism 230 onto the forming ring with a tilting mechanism 240 (Step 3).

Figure 7:
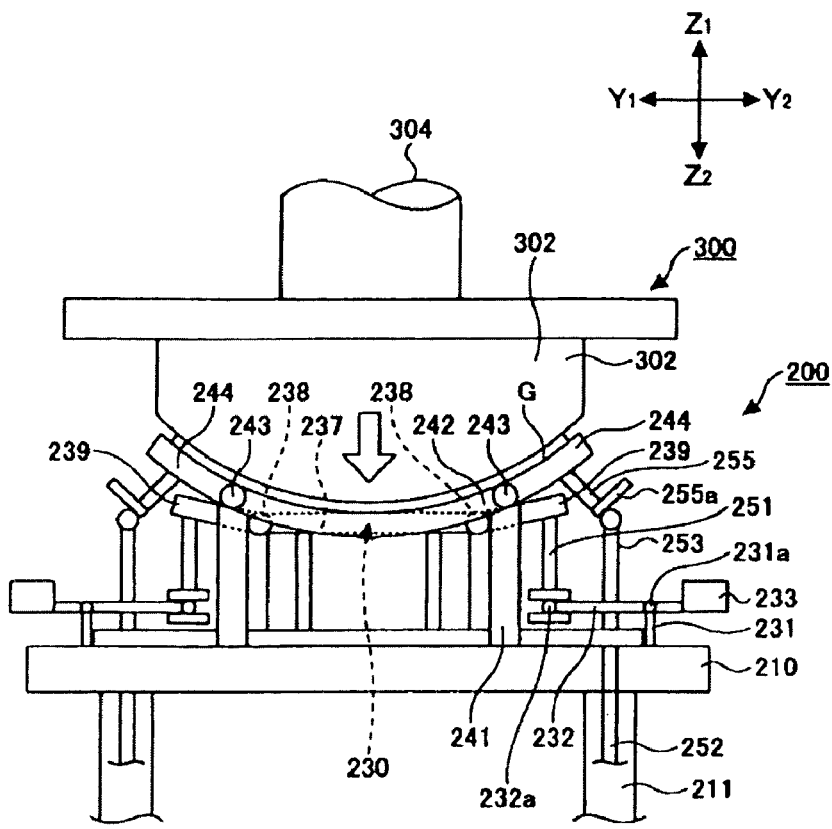
FIG. 7 is a side view showing a press-forming operation by an upper mold.

After the completion of transferring the glass sheet G onto the forming ring with a tilting mechanism 240, the upper forming apparatus 300 is driven downward to press the glass sheet G while the movable frames 244 of the forming ring with a tilting mechanism 240 are tilted, as shown in FIG. 7.

Namely, while the forming mold 302 is descended, the movable rods 253 are ascended to tilt the movable frames 244 of the forming ring with a tilting mechanism 240 so that the glass sheet G is sandwiched between the forming mold 302 and the forming ring with a tilting mechanism 240 to thereby conduct the press-forming (Step 4). In this case, the tilting rate for the glass sheet G is subjected to a driving control of the servo motors M2. It can be controlled by adjusting the moving rate of the movable rods 253 in a direction Z1.

Then, air is sucked through the innumerable number of orifices formed in the forming plane of the forming mold 302 to thereby hold by sucking the glass sheet G on the forming plane, and the upper forming apparatus 300 is ascended while the movable frames 244 are opened outward. Thereafter, the lower forming apparatus 200 is returned to a position of upper stream side, and at the same time, a quench ring 33a is advanced forward into the forming furnace 20. The quench ring is stopped just below the forming mold 302 on which the glass sheet G is held by sucking.

Then, the suction of air in the forming mold 302 is canceled so that the glass sheet G falls to be placed on the quench ring 33a. The quench ring 33a holding thereon the glass sheet G is conveyed out of the forming furnace 20 to carry the glass sheet between the lower blowing head 31 and the upper blowing head 32 of the air-cooling/tempering apparatus 30 where the glass sheet G is cooled and tempered by blowing air from the nozzles of the both heads.

When the cooling/tempering is complete, a blowing pressure from the lower blowing head 31 is made stronger than the upper blowing head 32 to press the glass sheet G to a lower plane of the upper blowing head 32 by a force of air, and at the same time, a catch member 33b is moved just below the glass sheet G. Then, the blowing pressures of the both heads are weakened to receive the glass sheet G on the catch member 33b.

Then, the shuttle 33 is moved horizontally to convey the glass sheet G to a position above the air-floating apparatus 41. The glass sheet G having reached above the air-floating apparatus 41 is raised by a blowing pressure of air jetted out from the air-floating apparatus 41 to come in contact with a stopper 42, during which the shuttle 33 is moved horizontally toward the forming furnace 20. Then, by canceling the air-blowing, the glass sheet G falls onto a delivering roller conveyor 40 made of rubber and the glass sheet is conveyed to an examining step (not shown) by the conveyor 40. The above-mentioned steps are repeated until production for all glass sheets is complete (Step S5).

The method for bending a glass sheet G according to the above-mentioned embodiment employs the lower forming apparatus 200 comprising the inner mold with a tilting mechanism 230 provided with the movable frames of inner mold 239. Accordingly, prior to bending the glass sheet G by the forming ring with a tilting mechanism 240, the glass sheet is tilted by the movable frames of inner mold 239 of the inner mold with a tilting mechanism 230 to carry out preforming for a deep-set bending, and then the glass sheet is transferred onto the forming ring with a tilting mechanism 240, on which the glass sheet G is pressed by the forming mold while it is tilted by the movable frames 244. Thus, the glass sheet is bent gradually for deep-set bending. Accordingly, it is unnecessary to tilt sharply, and therefore, it is possible to conduct highly precise molding and to suppress the occurrence of a wrinkle even when a complicated deep-set bending operation is to be carried out.

In the above-mentioned embodiment, the fixed frame of inner mold 237 and the movable frames of inner mold 239 are substantially flush when the movable frames of inner mold 239 are not tilted as shown in FIGS. 9(A), (B). However, the fixed frame of inner mold 237 and the movable frames of inner mold 239 are not always be substantially flush in a state that the movable frames are not tilted.

For example, in a case that the shape of a glass sheet G to be placed on the inner mold with a tilting mechanism 230 has a curved plane, the shapes of the planes of a fixed frame of inner mold 237A and movable frames of inner mold 239A on which a glass sheet G is placed may have shapes corresponding to the plane of the glass sheet G to be formed, as an inner mold with a tilting mechanism 230A shown in FIGS. 9(C), (D). Such structure can avoid a displacement of transfer position of the glass sheet when it is placed on the inner mold with a tilting mechanism 230. In FIGS. 9(C), (D), a reference numeral 238A designates a hinge of inner mold.

Next, description will be made as to an apparatus for bending a glass sheet and a method for bending a glass sheet G using such apparatus according to a second embodiment of the present invention.

Figure 10:
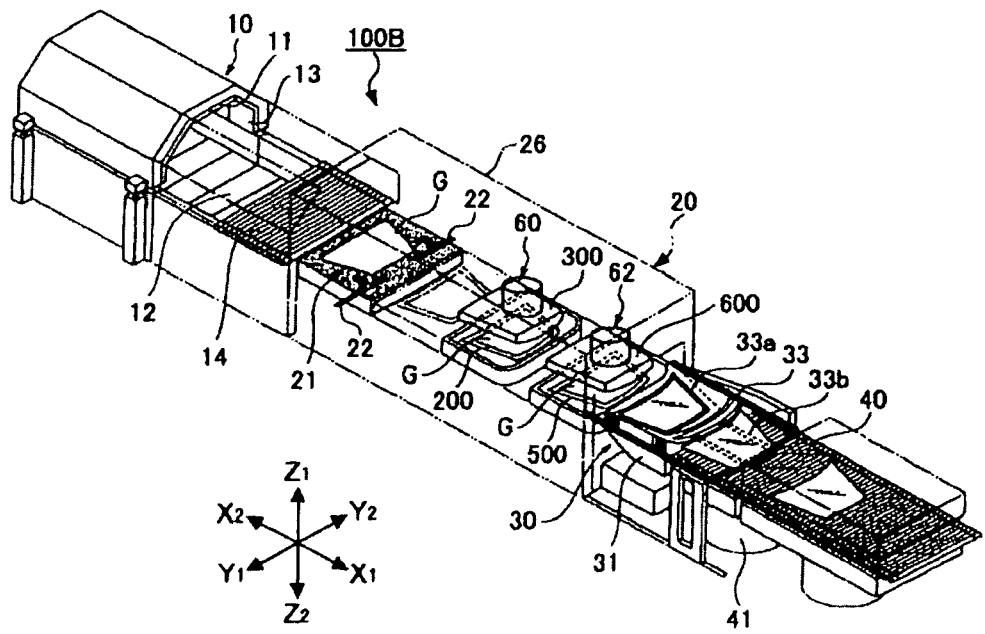
FIG. 10 is a perspective view of a second embodiment of the apparatus for bending a glass sheet according to the present invention wherein a part of the apparatus is in a see-through state.
Figure 11:
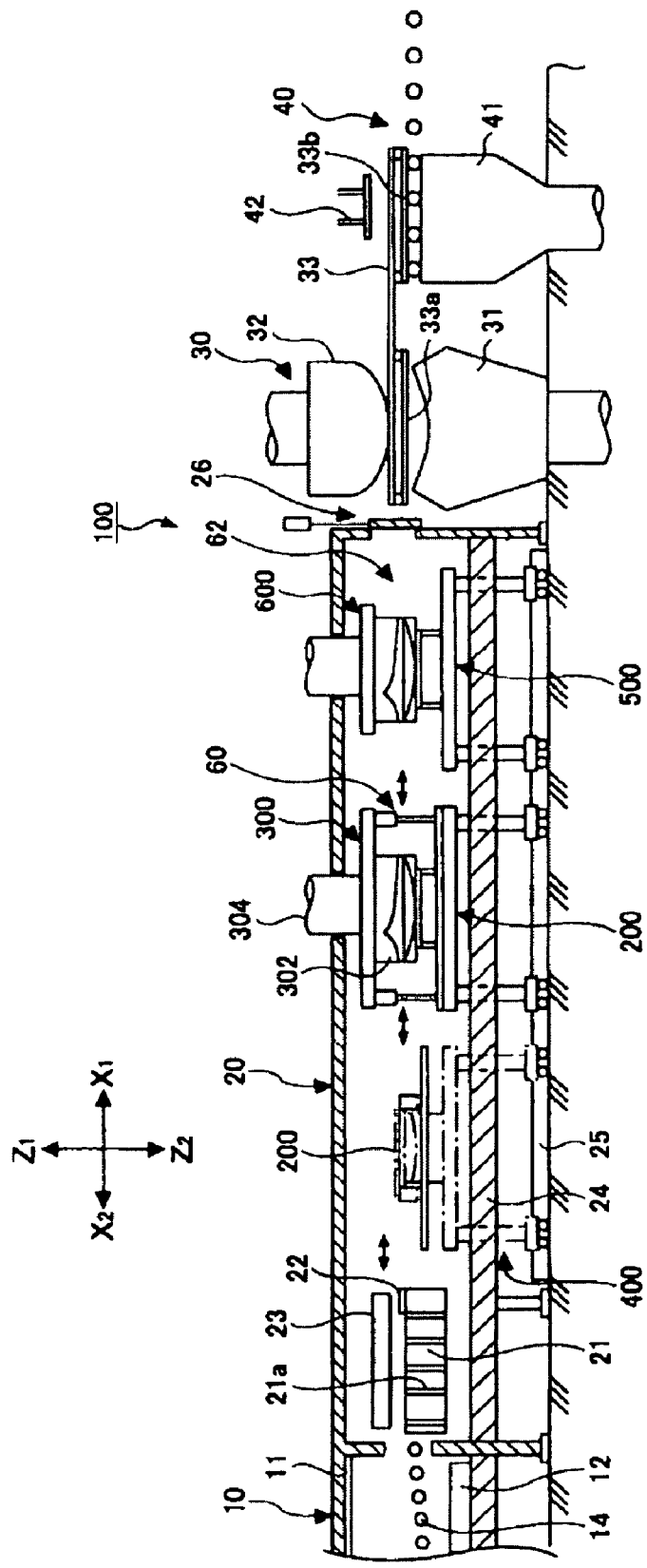
FIG. 11 is a schematic front view of the bending apparatus shown in FIG. 10.

FIGS. 10 and 11 show an apparatus for bending a glass sheet 100B according to the second embodiment of the present invention. In FIGS. 10 and 11 and FIGS. 12 and 13 used for explaining operations later, elements of the structure corresponding to those of the glass sheet bending apparatus 100A according to the first embodiment shown in FIGS. 1 to 9 are designated with the same reference numerals, and therefore, description on these elements is omitted.

The glass sheet bending apparatus 100A of the first embodiment has such structure that the forming furnace 20 has only one lower forming apparatus 200 and only one upper forming apparatus 300. On the other hand, in the glass sheet bending apparatus 100B of this embodiment, the forming furnace 20 has a preforming apparatus 60 and a full-forming apparatus 62.

Namely, in the second embodiment, a bending apparatus having substantially the same structure as the glass sheet bending apparatus of the first embodiment is used as a preforming apparatus in which a glass sheet is preformed and then the glass sheet is subjected to full-forming in the full-forming apparatus 62.

The preforming apparatus 60 is to preform a glass sheet G transferred from the flat mold 23, the apparatus 60 being constituted with a lower forming apparatus 200 and an upper forming apparatus 300. This lower forming apparatus 200 and the upper forming apparatus 300 have respectively substantially the same structures as those described with reference to the first embodiment, and therefore, description on the lower forming apparatus 200 and the upper forming apparatus 300 is omitted.

Figure 12:
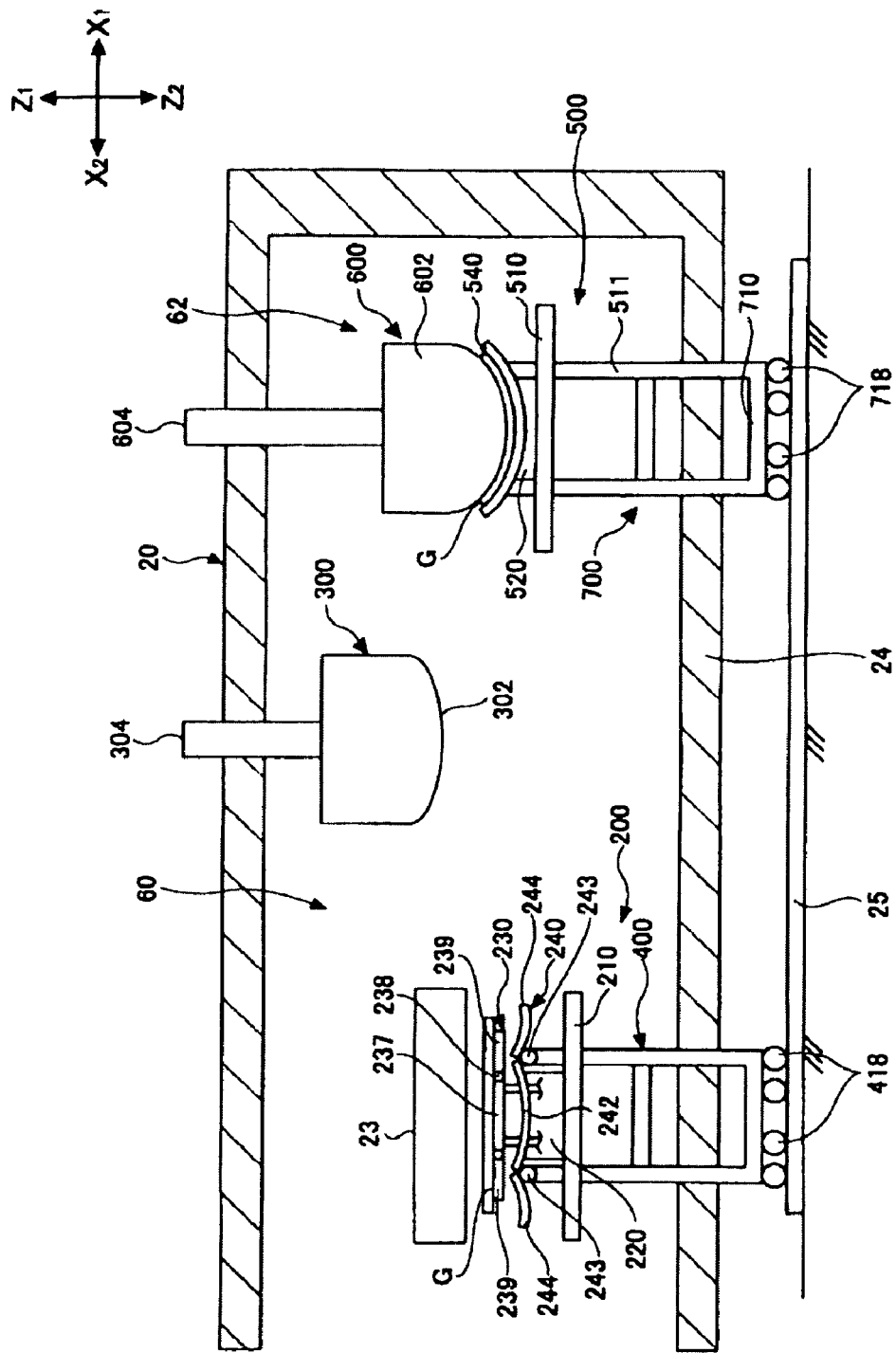
FIG. 12 is a diagram of an essential portion (No. 1) for illustrating the operation of the glass sheet bending apparatus according to the second embodiment of the present invention.
Figure 13:
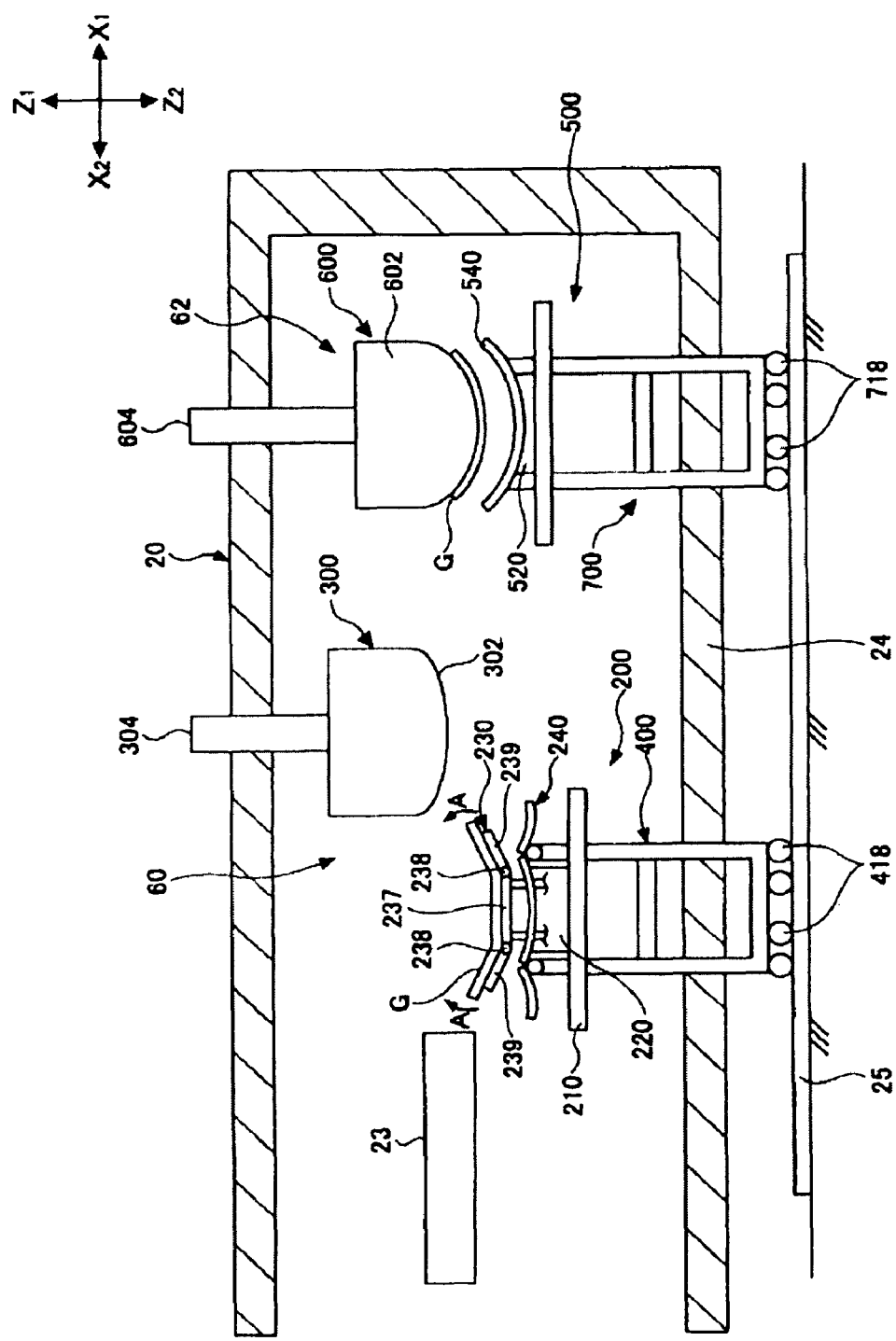
FIG. 13 is a diagram showing the essential portion (No. 2) for illustrating the operation of the glass sheet bending apparatus according to the second embodiment of the present invention.

The full-forming apparatus 62 comprises a lower forming apparatus 500 and an upper forming apparatus 600. As shown in FIG. 12, the lower forming apparatus 500 comprises a shuttle 700 for supporting a mount 510 and is movable independently on the rails 25, a lower mold 520 disposed on the mount 510 and a full-forming ring 540 disposed around the lower mold 520. The lower mold 520 and the full-forming ring 540 are so formed as correspond to the shape of a glass sheet G as a final product.

The shuttle 700 has basically the same structure as the shuttle 400 described with reference to FIG. 4. Specifically, the shuttle 700 comprises a mount 510, legs 511, a base 710, a traveling roller 718 etc.

The mount 510 supports the lower mold 520 and the full-forming ring 540 as described before. The base 710 is provided with the traveling roller 718 driven by the servo motor M4 (FIG. 4). The traveling roller 718 is engaged with the rails 25. Accordingly, by actuating the servo motor M4, the shuttle 700 is moved in a direction of arrow mark X1 or X2 (conveying directions of glass sheet G). The servo motor M4 disposed on the shuttle 400 is connected to a controller (not shown) for controlling integratedly the glass sheet bending apparatus 100B so that the driving operations are controlled by the controller.

The shuttle 400 of the lower forming apparatus 200 is not connected to the shuttle 700 of the lower forming apparatus 500 so that they are moved independently from each other. The servo motor M4 disposed on each of the shuttle 400 and 700 is connected to a controller (not shown) so that driving operations are controlled by this controller.

The shape of the surface of the forming ring with a tilting mechanism 240 or the lower mold 220 disposed in the above-mentioned preforming apparatus 60 (the lower forming apparatus 200) is shallower than the shape of the surface of the full-forming ring 540 of the full-forming apparatus 62 (the lower forming apparatus 500). Namely, it is preferable that the deformation volume of a glass sheet G at the time of preforming is from 20 to 80% (20 to 50% in the optimum value) of the deformation volume that a flat glass sheet is deformed to a final shape. Such values can preferably be determined by using a cross-curvature of a glass sheet G as a parameter.

The cross-curvature may be determined based on a radius of curvature in an in-plane portion of a glass sheet where the degree of deformation is largest (a portion where the tensile force produced at the time of bending is largest, for example). Or, it may be determined based on a mean value of radii of curvature at plural points. In either case, the preforming should be carried out in a range of from 20 to 80% of the final radius of curvature. By conducting such preforming, an unreasonable stress does not produce in a glass sheet G at the time of full-forming, and it is possible to prevent a problem of production of wrinkles or an optical distortion in the glass sheet.

The upper forming apparatus 600 comprises a full-forming mold 602 disposed on a mount (not shown) and a duct 604 communicated with the full-forming mold 602. The full-forming mold 602 is a metallic (cast metal) mold having a hollow interior, and the plane coming to contact with a glass sheet G (hereinbelow, referred to as the forming plane) has a predetermined curved shape.

An innumerable number of orifices are formed in the forming plane. When air is vacuumed up through the duct 604, air is sucked into the mold through each orifice whereby a press-formed glass sheet G can be held by sucking. On the contrary, air can be blown through the duct 604. The forming plane of the full-forming mold 602 is covered with a heat resistant cloth or a heat-resistant non-woven cloth made of stainless steel or the like.

Now, description will be made as to a method for forming a glass sheet G using the glass sheet bending apparatus 100B having the above-mentioned structure, with reference to FIGS. 12 to 15.

FIGS. 12 to 15 are diagrams of essential portions in an enlarged view of an area from the preforming apparatus 60 to the full-forming apparatus 62 in the glass sheet bending apparatus 101B. In the illustrations of the lower forming apparatus 200 and the lower forming apparatus 500 in FIGS. 12 to 15, when a glass sheet G is conveyed in a direction of arrow mark X1 as in FIGS. 12 to 15, the lower forming apparatus 200 and the lower forming apparatus 500 should formally be shown in front views (as the diagram shown in FIG. 4). However, for convenience of illustration and description, the lower forming apparatus 200 and the lower forming apparatus 500 are shown in a side view as in FIGS. 12 to 15.

FIG. 12 shows a state that a glass sheet G to be now subjected to a forming treatment is transferred from the flat mold 23 onto the inner mold with a tilting mechanism 230. At this moment, the shuttle 400 is at the position of extreme end in a direction of arrow mark X2 in the figure, and in this state, the lower forming apparatus 200 is positioned just below the flat mold 23. At this moment, the lower forming apparatus 500 of the full-forming apparatus 62 is positioned just below the upper forming apparatus 600 at which a full-forming treatment is carried out to the glass sheet G having been subjected to the previous forming treatment, by the full-forming mold 602.

As described above, when the glass sheet G is placed on the fixed frame of inner mold 237 and the movable frames of inner mold 239 in a horizontal state, the servo motors M4 are actuated so that the lower forming apparatus 200 (the shuttle 400) begins to move independently in a direction of arrow mark X1. In this case, the movement of the shuttle 400 is independent from the shuttle 700. Namely, the shuttle 400 and the shuttle 700 are so constructed as to move independently each other.

When the lower forming apparatus 200 is moved independently, the servo motors M1 are actuated at the same time to descend the movable rods 252. Accordingly, the base 235 is also descended so that the movable frames of inner mold 239 are turned in directions as shown by arrow marks A in FIG. 13 (in the figure, illustrations of the movable rods 252 and the base 235 are omitted). The glass sheet G placed on the inner mold with a tilting mechanism 230 is softened by heat at a temperature capable of bending in a high-temperature environment of the forming furnace 20. Accordingly, the glass sheet G placed on the inner mold with a tilting mechanism 230 is bent by the tilting movement of the movable frames of inner mold 239 pivoted at both ends of the fixed frame of inner mold 237 whereby the first preforming process (it corresponds to the preforming process described in Claims) is carried out.

The first preforming process to the glass sheet G by the movable frames of inner mold 239 is conducted in a time that the lower forming apparatus 200 is moved from the position at which the glass sheet G is transferred from the flat mold 23 to a position just below the upper forming apparatus 300. Thus, since the first preforming is carried out by utilizing the time of conveying the glass sheet G, the time of forming the glass sheet G can be shortened, and the efficiency of forming the glass sheet G can be improved.

At this time, on the full-forming apparatus 62, the full-forming to the glass sheet G having been once subjected to preforming is finished, and the full-forming mold 602 is in a state away from the full-forming ring 540. On the other hand, the full-formed glass sheet g is in a state of being sucked to the full-forming mold 602 since air is sucked through the innumerable number of orifices formed in the forming plane of the full-forming mold 602.

When the lower forming apparatus 200 is moved so that the glass sheet G reaches just below the upper forming apparatus 300, the base 235 is descended to descend the fixed frame of inner mold 237, with the result that the forming ring with a tilting mechanism 240 and the inner mold with a tilting mechanism 230 come closer to each other during which the glass sheet G is tilted. With this, the glass sheet G is transferred gradually from the inner mold with a tilting mechanism 230 to the forming ring with a tilting mechanism 240.

Figure 14:
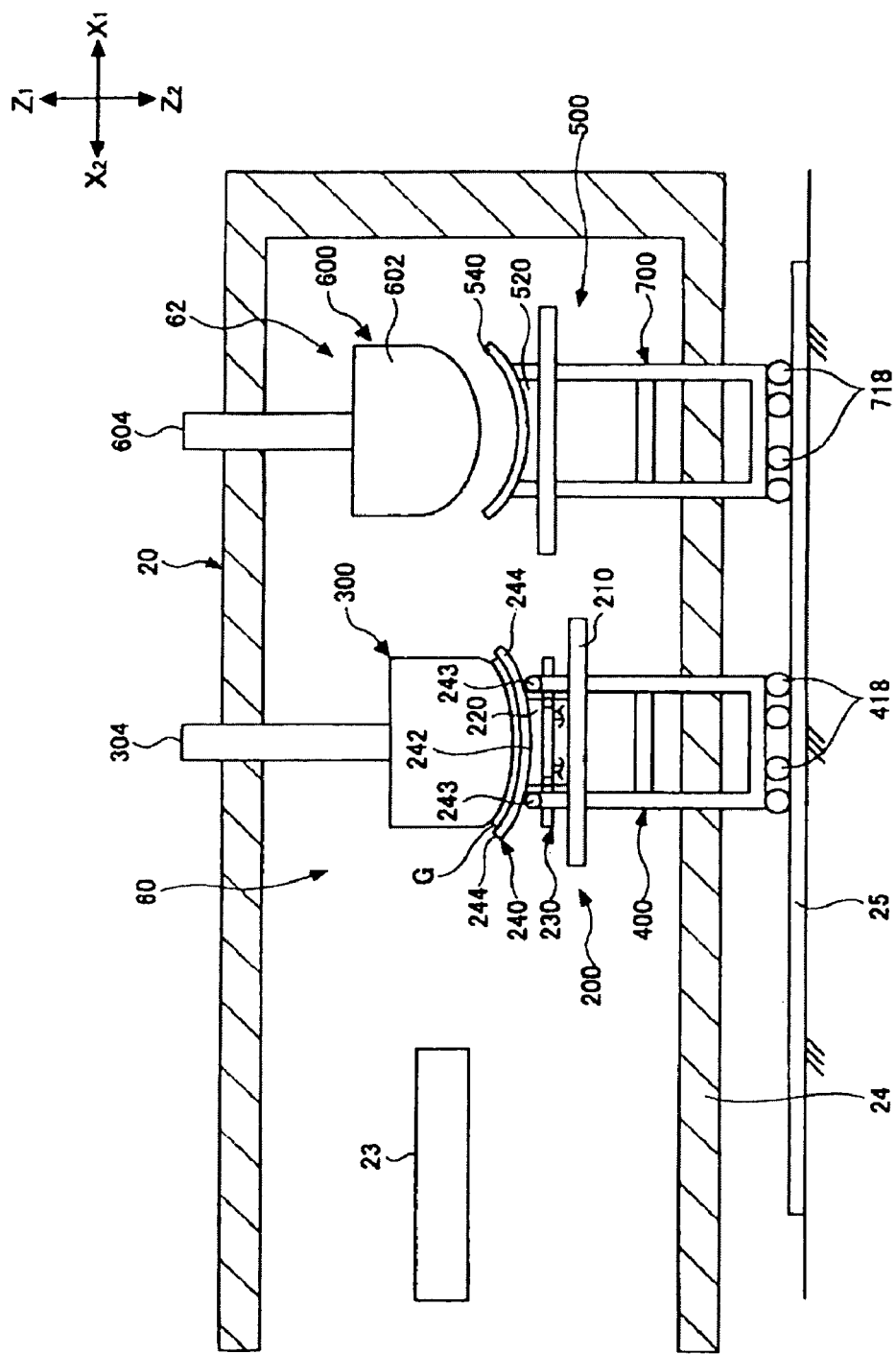
FIG. 14 is a diagram for the essential portion (No. 3) for illustrating the operation of the glass sheet bending apparatus according to the second embodiment of the present invention.

After the transfer of the glass sheet G onto the forming ring with a tilting mechanism 240, the upper forming apparatus 300 is driven downward to press the glass sheet G while the movable frames 244 of the forming ring with a tilting mechanism 240 are tilted as shown in FIG. 14. Namely, the movable rods 253 are ascended while descending the forming mold 302 whereby the movable frames 244 of the forming ring with a tilting mechanism 240 are tilted, and the glass sheet G is pressed between the forming mold 302 and the forming ring with a tilting mechanism 240, thus, the second preforming is carried out.

At that time, the glass sheet G full-formed in the full-forming apparatus 62 is conveyed through the shuttle door 26 (see FIG. 11) to the air-cooling/tempering apparatus 30.

Figure 15:
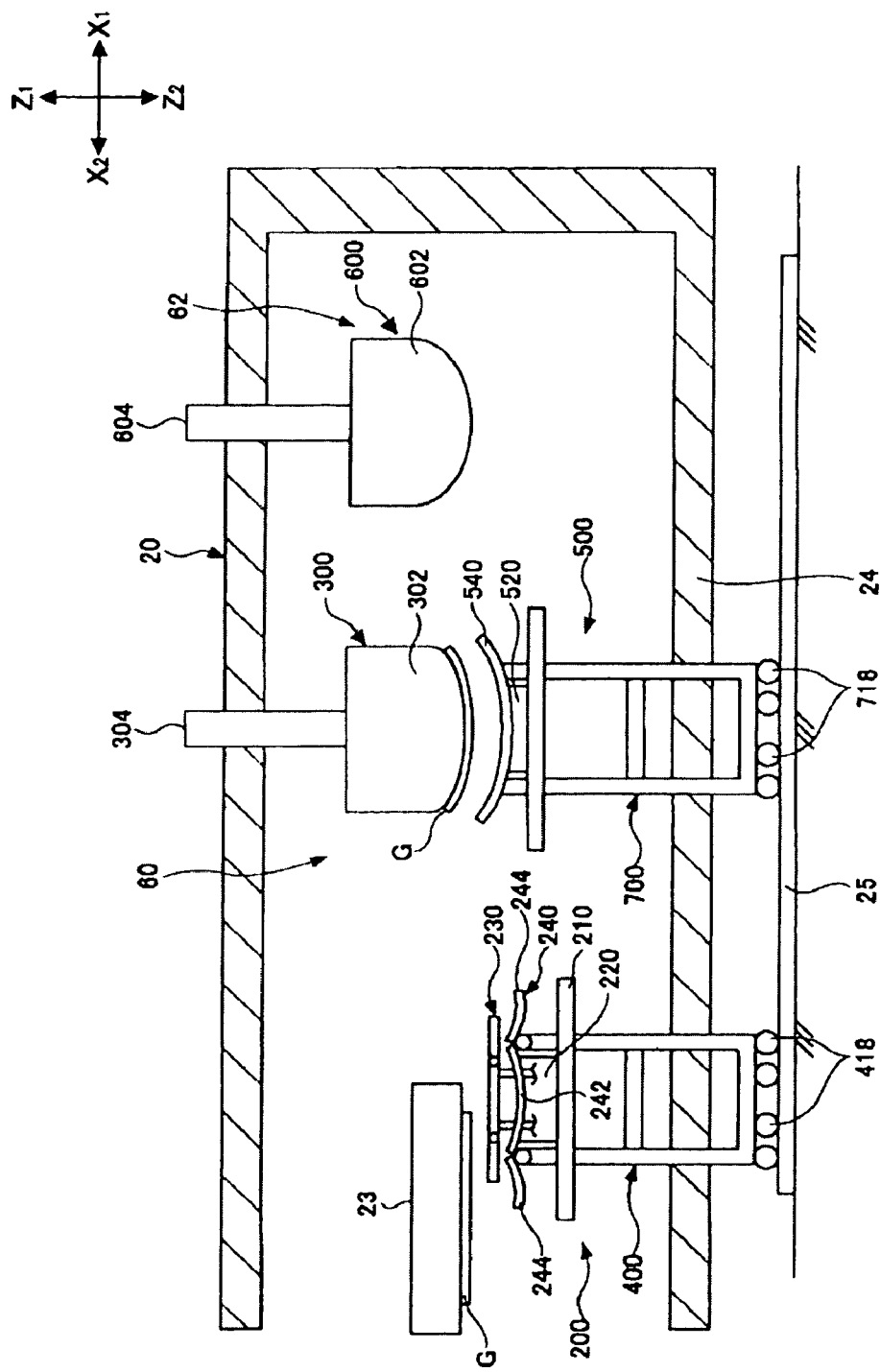
FIG. 15 is a diagram of the essential portion (No. 4) for illustrating the operation of the glass sheet bending apparatus according to the second embodiment of the present invention.

When the second preforming treatment is completed, air is sucked through the innumerable number of orifices formed in the forming plane of the forming mold 302 to suck and hold the glass sheet G on the forming plane, and the upper molding apparatus 300 and the lower molding apparatus 200 are separated while the movable frames 244 are opened outward. Then, the lower forming apparatus 200 is moved independently in a direction of arrow mark X2 to the position that the glass sheet G is transferred from the flat mold 23, and at the same time, the lower forming apparatus 500 is moved independently in a direction of arrow mark X2 to the position just below the upper forming apparatus 300. FIG. 15 shows a state that the lower forming apparatus 200 is moved to the position just below the flat mold 23 and the lower forming apparatus 500 is moved to the position just below the upper forming apparatus 300.

Then, the forming mold 302 holding the glass sheet G by sucking and the full-forming ring 540 of the lower forming apparatus 500 come closer to each other, and then the sucking action is stopped whereby the glass sheet G is transferred onto the full-forming ring 540. When the glass sheet G is transferred onto the full-forming ring 540, the lower forming apparatus 500 begins to move independently to the position just below the upper forming apparatus 600.

At that time, the lower forming apparatus 200 stays at the position at which the glass sheet G is transferred from the flat mold 23. The flat mold 23 conveys the glass sheet G subjected to positioning on the hearth bed 21 toward an upper position of the lower forming apparatus 200.

When the flat mold 23 which holds by sucking a glass sheet G to be subjected to the next forming treatment is moved to the position just above the inner mold with a tilting mechanism 230 and the lower forming apparatus 500 is moved to the position just below the upper forming apparatus 600, the glass sheet G to be subjected to the next forming treatment is transferred from the flat mold 23 to the inner mold with a tilting mechanism 230. At the same time, in the full-forming apparatus 62, the full-forming mold 602 is pressed to the full-forming ring 540 whereby the full-forming treatment is carried out to the glass sheet G to be subjected to the full-forming treatment just now.

Thus, the treatment described with reference to FIGS. 12 to 15 is repeatedly carried out so that forming treatments to glass sheets G are continuously carried out. In the glass sheet bending apparatus 100B according to the second embodiment of the present invention and the method for bending a glass sheet G using the bending apparatus, the preforming apparatus 60 and the full-forming apparatus 62 are employed, hence, two forming molds 302, 602 and two lower forming apparatuses 200, 500 are employed to conduct a two-stage bending treatment to glass sheets G, and accordingly, it is possible to conduct more complicated deep-set bending to the glass sheets G.

Further, in the structure for conducting the two-stage bending to the glass sheets G, the shuttle 400 and the shuttle 700 are movable independently. Accordingly, a useless waiting time in the movement of each shuttle 400, 700 is avoided whereby a highly sufficient conveyance is obtainable for glass sheet G. Therefore, it is possible to increase the forming efficiency to glass sheets G and to shorten the time required for the forming treatment.

With respect to the glass sheet bending apparatus 100 of the second embodiment, description has been made as to the structure that the inner mold with a tilting mechanism 230 and the forming ring with a tilting mechanism 240 are provided in only the lower forming apparatus 200 of the preforming apparatus 60, as an example. However, the inner mold with a tilting mechanism 230 and the forming ring with a tilting mechanism 240 may also be provided in the lower forming apparatus of the full-forming apparatus 62. With such structure, it is possible to achieve a further deep-set bending treatment.

As described above, preferred embodiments of the present invention have been described. However, the present invention is not limited to these embodiments. For example, other than the structure that the movable frames and the movable frames of inner mold are pivoted respectively to both ends of the forming ring and the inner mold, they may be pivoted to only one end of the forming ring and the inner mold in a case that only one end of a glass sheet is subjected to a deep-set bending treatment.

Further, although it is preferable to employ the system of descending the forming mold to the forming ring to bend a glass sheet in consideration of manufacturing the apparatus and practical operations of it, it may employ such a system that the forming ring is ascended to the forming mold to bend a glass sheet.

Industrial Applicability

The present invention is suitable for producing a curved glass of complicated shape or deep-set shape, in particular it can be applied preferably to the manufacture of a window glass for automobiles.

The entire disclosure of Japanese Patent Application No. 2006-341471 filed on Dec. 19, 2006 including specification, claims, drawings and summary is incorporated herein by reference in its entirety.

What is claimed is:

1. A method for bending a glass sheet, comprising:
heating a glass sheet to a temperature capable of bending;
gravity preforming the glass sheet by placing the glass sheet heated to the temperature on an inner mold comprising a fixed frame coupled to a movable frame to form a closed pre-forming ring configured to support a peripheral region of the glass sheet such that the glass sheet is preformed by sagging due to a weight of the glass sheet at an inner opening of the pre-forming ring;
mechanically preforming the glass sheet by tilting the movable frame of the inner mold about a pivot point which couples the movable frame of the inner mold to an end of the fixed frame of the inner mold;
transferring the glass sheet preformed on the inner mold from the inner mold onto a forming ring comprising another fixed frame coupled to another movable frame to form a closed forming ring configured to support a peripheral region of the glass sheet and having an inner space, said transferring comprising passing the inner mold through the inner space of the forming ring such that the glass sheet is moved from a position of placing the glass sheet on the inner mold to a lower position of the forming ring, during which the movable frame of inner mold is tilted for mechanically performing; and
pressing the glass sheet supported by the forming ring with a forming mold having a forming plane while bending the glass sheet by tilting the another movable frame of the forming ring about another pivot point which couples the another movable frame to the another fixed frame of the forming ring.

2. The bending method for a glass sheet according to claim 1, wherein the movable frame of the inner mold is provided in a plurality, the movable frame of the forming ring is provided in a plurality, and the plurality of movable frames of the forming ring and the plurality of movable frames of the inner mold are configured to be respectively pivoted at both ends of the forming ring and the inner mold.

3. An apparatus for bending a glass sheet comprising:
a forming ring comprising a fixed frame and a tilting mechanism which couples the fixed frame to a movable frame such that the movable frame is configured to be pivoted with respect to the fixed frame of the forming ring, the forming ring being configured to support a peripheral region of the glass sheet and having an inner space;
an inner mold positioned in the inner space of the forming ring and having another fixed frame and another tilting mechanism which couples the another fixed frame to another movable frame such that the another movable frame is configured to be pivoted with respect to the another fixed frame of the inner mold; and a forming mold having a forming plane and configured to press a glass sheet placed on the forming ring with the forming plane of the forming mold such that the glass sheet is bent by pressing the glass sheet and also tilting the movable frame of the forming ring, wherein the forming ring and the inner mold are disposed in a shuttle configured to travel from a position of transferring the glass sheet on the inner mold to a position of the forming mold, and the another tilting mechanism of the inner mold tilts the another movable frame of the inner mold by an elevating motion of a movable rod provided on the shuttle.

4. The apparatus for bending a glass sheet according to claim 3, wherein the inner mold has a plane with a shape corresponding to a shape of a plane of the glass sheet to be placed.

5. The apparatus for bending a glass sheet according to claim 4, wherein:

the another movable frame of the inner mold comprises a plurality of frames which are movable with respect to the another fixed frame of the inner mold, the movable frame of the forming ring comprises in a plurality of frames which are movable with respect to the fixed frame of the forming ring, the plurality of movable frames of the forming ring and the plurality of movable frames of the inner mold are configured to be pivoted with respect to the forming ring and the inner mold respectively, and the forming mold is movable vertically.

6. The apparatus for bending a glass sheet according to claim 3, wherein:

the another movable frame of the inner mold comprises a plurality of frames which are movable with respect to the another fixed frame of the inner mold, the movable frame of the forming ring comprises a plurality of frames which are movable with respect to the fixed frame of the forming ring, the plurality of movable frames of the forming ring and the plurality of movable frames of the inner mold are configured to be pivoted with respect to the forming ring and the inner mold respectively, and the forming mold is movable vertically.

* * * * *